G. W. WELCH.

Bushing for Piston Rods, &c.

No. 134,955.

Patented Jan. 14, 1873.

Witnesses.

Inventor.
George W. Welch

UNITED STATES PATENT OFFICE.

GEORGE W. WELCH, OF FORT WAYNE, INDIANA.

IMPROVEMENT IN BUSHINGS FOR PISTON-RODS, &c.

Specification forming part of Letters Patent No. 134,955, dated January 14, 1873.

*To all whom it may concern:*

Be it known that I, GEORGE W. WELCH, of Fort Wayne, in the county of Allen and State of Indiana, have invented a new and Improved Bushing for Stuffing-Boxes; and I do hereby declare the following to be a full, clear, and exact description thereof, which will enable those skilled in the art to make and use the same, reference being had to the accompanying drawing forming a part of this specification, in which drawing—

Figure 1:
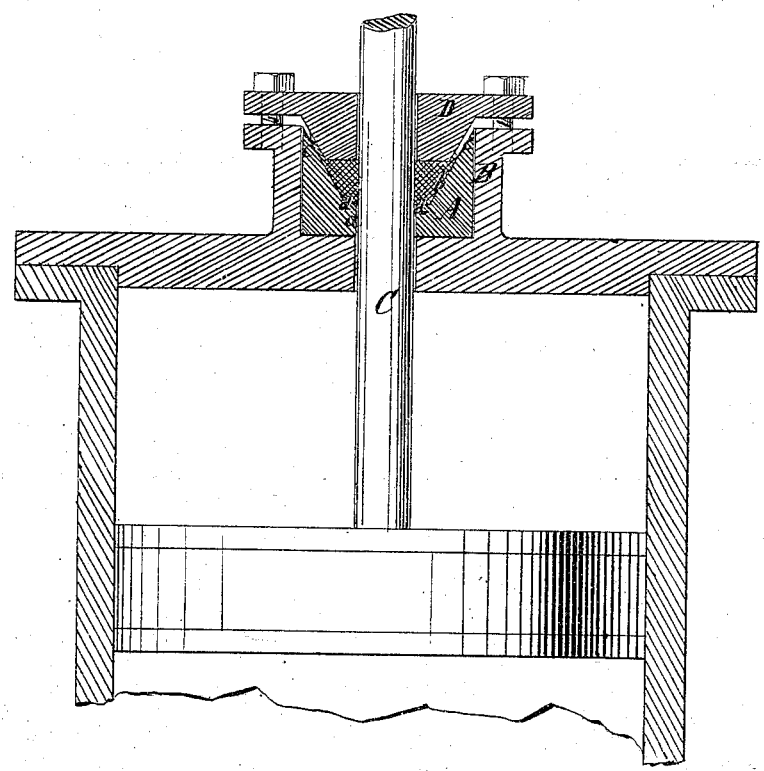
Figure 2:
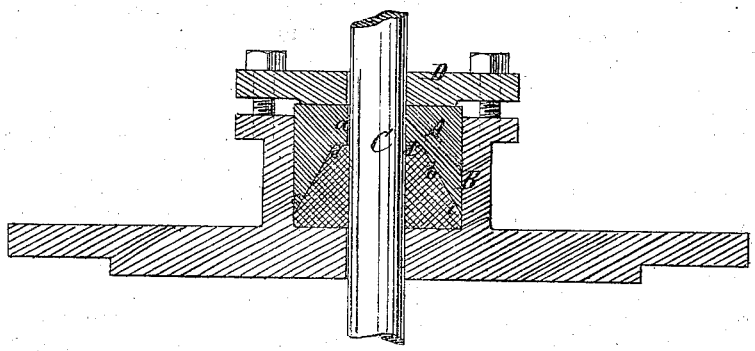

Figure 1 represents a central section of my bushing as applied to the stuffing-box of the piston-rod of a steam-cylinder. Fig. 2 is a similar section of the same when its position in the stuffing-box is reversed.

Similar letters indicate corresponding parts.

This invention consists in a bushing made of wood, brass, or any other suitable material, and turned off to fit the stuffing-box of a piston-rod, or of any other rod or shaft, said bushing being bored out to receive the rod or shaft, and also provided with a tapering recess extending from the edge of the bushing down to a square shoulder formed at the inner end of the hole through which the rod or shaft is to pass, in such a manner that the bushing forms a correct guide for the shaft or rod, and if worn out said bushing can be readily replaced, while, at the same time, by the tapering recess in the bushing, the packing is firmly compressed against the rod or shaft, and a tight joint is produced without difficulty.

In the drawing, the letter A designates my bushing, which is made, by preference, of metal, such as brass or cast-iron, but which, in some cases, may be made of hard wood. This bushing is turned off on the outside to fit the stuffing-box B, and it is provided with a hole, $a$, through which the rod or shaft C passes. In one end of the bushing is a tapering recess, $b$, which extends from the edge $c$ down to a shoulder, $d$, formed at the inner end of the hole $a$. This recess is intended to receive the packing, and if the bushing is inserted into the stuffing-box in the position shown in Fig. 1, the gland D is provided with a tapering projection which presses on the packing contained in the recess $b$, and presses the same up against the circumference of the rod or shaft C. As the same is worn or compressed, the projection on the gland, being of a smaller diameter than the interior space of the stuffing-box, enables the bushing to be forced inward and closely adjusted. My bushing may, however, also be used in the position shown in Fig. 2.

If the hole $b$ in the bushing wears out a new bushing can be readily supplied, and a correct guide for the rod or shaft C is provided, while, at the same time, by the packing in the tapering recess $b$, a tight joint is produced round the shaft or rod.

What I claim as new, and desire to secure by Letters Patent, is—

The adjustable bushing A, provided with the tapering recess $b$ and shoulder $d$ for the packing $x$, in combination with the gland D, all constructed and arranged as herein shown and described.

GEOR. W. WELCH.

Witnesses:
JAMES E. GRAHAM,
MART. V. B. GOLSHALL.